US010938269B2

United States Patent
Kamogi et al.

(10) Patent No.: US 10,938,269 B2
(45) Date of Patent: Mar. 2, 2021

(54) MOTOR WITH STRESS ABSORBING PORTIONS

(71) Applicant: Minebea Mitsumi Inc., Nagano (JP)

(72) Inventors: Yutaka Kamogi, Fukuroi (JP); Yasuhiro Ikehara, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 279 days.

(21) Appl. No.: 15/693,605

(22) Filed: Sep. 1, 2017

(65) Prior Publication Data

US 2018/0062478 A1 Mar. 1, 2018

(30) Foreign Application Priority Data

Sep. 1, 2016 (JP) .............................. JP2016-171148

(51) Int. Cl.
*H02K 5/24* (2006.01)
*H02K 11/33* (2016.01)
(Continued)

(52) U.S. Cl.
CPC .............. *H02K 5/24* (2013.01); *H02K 11/33* (2016.01); *H02K 21/16* (2013.01); *H02K 1/2733* (2013.01); *H02K 2203/03* (2013.01)

(58) Field of Classification Search
CPC ........ H02K 1/2733; H02K 5/24; H02K 11/24; H02K 21/16; H02K 2203/03
(Continued)

(56) References Cited

U.S. PATENT DOCUMENTS 5,532,887 A * 7/1996 Higashiyama ....... G11B 5/0086
360/63
2004/0261256 A1* 12/2004 Sadiku ................. H02K 15/066
29/732
(Continued)

FOREIGN PATENT DOCUMENTS

JP 2013-207963 A 10/2013
JP 2015146710 A 8/2015
WO 2008102482 A1 8/2008

OTHER PUBLICATIONS

Notification of Reasons for Refusal dated Mar. 19, 2019 in a corresponding JP application No. 2016-171148.

*Primary Examiner* — Shawki S Ismail
*Assistant Examiner* — Monica Mata
(74) *Attorney, Agent, or Firm* — Pearne & Gordon LLP

(57) ABSTRACT

A motor according to the present disclosure is a motor including a motor body part and a driving circuit part, the motor body part including: a rotor; a stator including a wound coil; a winding terminal electrically connected to the coil and extending toward the driving circuit part; and a frame housing the rotor and the stator, wherein the driving circuit part includes: a case including a first attaching portion and a frame portion with openings on both end sides of the frame portion; a first wiring board including a driving circuit and a power device mounted on the first wiring board, the first wiring board being fixed to the first attaching portion; and a first electric wiring member including a first stress absorbing portion formed into a shape absorbing stress, the first electric wiring member electrically connecting the winding terminal and the first wiring board.

17 Claims, 7 Drawing Sheets

(51) Int. Cl.
*H02K 21/16* (2006.01)
*H02K 1/27* (2006.01)

(58) Field of Classification Search
USPC .......................................................... 310/51
See application file for complete search history.

(56) References Cited

U.S. PATENT DOCUMENTS

| | | |
|---|---|---|
| 2010/0007228 A1 | 1/2010 | Hatano et al. |
| 2012/0161689 A1* | 6/2012 | Yamasaki ............... H02P 25/22 |
| | | 318/724 |
| 2013/0257193 A1 | 10/2013 | Toda et al. |
| 2016/0204670 A1* | 7/2016 | Yamasaki ............ H02K 11/215 |
| | | 310/71 |
| 2017/0126104 A1* | 5/2017 | Yamanaka ............. H02K 11/25 |

* cited by examiner

MOTOR WITH STRESS ABSORBING PORTIONS

CROSS REFERENCE TO RELATED APPLICATIONS

This application claims the benefit of Japanese Patent Application No. 2016-171148, filed Sep. 1, 2016, which is hereby incorporated by reference in its entirety.

BACKGROUND

Technical Field

The present disclosure relates to a motor.

Background

Japanese Patent Laid-Open No. 2013-207963 discloses a driver (hereinafter referred to as a motor) including a motor (hereinafter referred to as a motor body part) and a control unit (hereinafter referred to as a driving circuit part), the motor body part being integrated with the driving circuit part.

In this motor, a motor terminal (hereinafter referred to as a winding terminal) extending from the motor body part toward the driving circuit part is connected to a power board of the driving circuit part.

SUMMARY

When the motor body part generates heat as the motor is driven, the winding terminal extends to apply stress to a connecting portion between the winding terminal and a power board (e.g., a board including a power device such as a power MOSFET mounted on the board). Repeated stress may cause a breakage of the connecting portion or other faults, resulting in instable electrical connection between the winding terminal and the power board.

In addition, in the case where the winding terminal is connected to the power board, the power device on the power board is to be disposed in a vicinity of a position of the connection between the winding terminal and the power board.

For this reason, there is not much flexibility as to where the power device may be disposed on the power board, and thus it is difficult to make a design that takes into account electromagnetic compatibility (EMC), such as disposing the power device at a position allowing an electromagnetic shield to be provided easily.

The present disclosure is made in view of such circumstances and has an objective to provide a motor having a high stability of electrical connection between a winding terminal and a circuit board including a power device provided on the circuit board, and having a high flexibility of a disposing position of the power device on the circuit board.

In accordance with one aspect of the present disclosure, (1) A motor according to the present disclosure is a motor including a motor body part and a driving circuit part, the motor body part including: a rotor; a stator including a wound coil; a winding terminal electrically connected to the coil and extending toward the driving circuit part; and a frame housing the rotor and the stator, wherein the driving circuit part includes: a case including a first attaching portion and a frame portion with openings on both end sides of the frame portion; a first wiring board including a driving circuit and a power device mounted on the first wiring board, the first wiring board being fixed to the first attaching portion; and a first electric wiring member including a first stress absorbing portion formed into a shape absorbing stress, the first electric wiring member electrically connecting the winding terminal and the first wiring board.

(2) In the configuration of the above (1), the driving circuit part includes: an external connection terminal led outward from an inside of the case, and a second electric wiring member including a second stress absorbing portion formed into a shape absorbing stress, the second electric wiring member electrically connecting the external connection terminal and the first wiring board.

(3) In the configuration of the above (2), the case includes a second attaching portion provided inside the case, the second attaching portion being provided closer to the motor body part than the first attaching portion, and the driving circuit part includes: a second wiring board fixed to the second attaching portion; and a third electric wiring member including a third stress absorbing portion formed into a shape absorbing stress, the third electric wiring member electrically connecting the second wiring board and the first wiring board.

(4) In the configuration of the above (3), the first electric wiring member, the second electric wiring member, and the third electric wiring member are each formed of a plate material.

(5) In the configuration of the above (3) or (4), the case includes a partitioning portion provided at a position inside the frame portion, the position being between the first wiring board and the second wiring board, and the frame portion and the partitioning portion are each formed of a resin material.

(6) In the configuration of the above (5), the first electric wiring member includes: a first relaying portion supported by the partitioning portion; a first terminal side extending portion extending from the first relaying portion toward the winding terminal and connected to the winding terminal; and a first board side extending portion extending from the first relaying portion toward the first wiring board and connected to the first wiring board, and the first stress absorbing portion is provided in at least one of the first terminal side extending portion and the first board side extending portion.

(7) In the configuration of the above (6), the first relaying portion is embedded in the partitioning portion.

(8) In the configuration of any one of the above (5) to (7), the second electric wiring member includes: a second relaying portion supported by the partitioning portion; a second terminal side extending portion extending from the second relaying portion toward the external connection terminal and connected to the external connection terminal; and a second board side extending portion extending from the second relaying portion toward the first wiring board and connected to the first wiring board, and the second stress absorbing portion is provided in at least one of the second terminal side extending portion and the second board side extending portion.

(9) In the configuration of the above (8), the second relaying portion is embedded in the partitioning portion.

(10) In the configuration of any one of the above (5) to (9), the third electric wiring member includes: a third relaying portion supported by the partitioning portion; one third board side extending portion extending from the third relaying portion toward the second wiring board and connected to the second wiring board; and other third board side extending portion extending from the third relaying portion toward the first wiring board and connected to the first wiring board, and the third stress absorbing portion is provided in at least one of the one third board side extending portion and the other third board side extending portion.

(11) In the configuration of the above (10), the third relaying portion is embedded in the partitioning portion.

(12) In the configuration of any one of the above (3) to (11), the first stress absorbing portion, the second stress absorbing portion, and the third stress absorbing portion are each formed into a shape expandable in response to stress.

(13) In the configuration of the above (1), the case includes a partitioning portion provided at a position inside the frame portion, the position being closer to the motor body part than the first wiring board, the frame portion and the partitioning portion are each formed of a resin material, the first electric wiring member includes: a first relaying portion supported by the partitioning portion; a first terminal side extending portion extending from the first relaying portion toward the winding terminal and connected to the winding terminal; and a first board side extending portion extending from the first relaying portion toward the first wiring board and connected to the first wiring board, and the first stress absorbing portion is provided in at least one of the first terminal side extending portion and the first board side extending portion.

(14) In the configuration of the above (2), the case includes a partitioning portion provided at a position inside the frame portion, the position being closer to the motor body part than the first wiring board, the frame portion and the partitioning portion are each formed of a resin material, the second electric wiring member includes: a second relaying portion supported by the partitioning portion; a second terminal side extending portion extending from the second relaying portion toward the external connection terminal and connected to the external connection terminal; and a second board side extending portion extending from the second relaying portion toward the first wiring board and connected to the first wiring board, and the second stress absorbing portion is provided in at least one of the second terminal side extending portion and the second board side extending portion.

(15) The configuration of the above (14) further including: a first relaying portion supported by the partitioning portion; a first terminal side extending portion extending from the first relaying portion toward the winding terminal and connected to the winding terminal; a first board side extending portion extending from the first relaying portion toward the first wiring board and connected to the first wiring board, and the first stress absorbing portion is provided in at least one of the first terminal side extending portion and the first board side extending portion.

Advantageous Effect of the Disclosure

With the present disclosure, it is possible to provide a motor having a highly stable electrical connection between a winding terminal and a circuit board including a power device provided on the circuit board, and having a high flexibility in a disposing position of the power device on the circuit board.

DETAILED DESCRIPTION

Figure 1:
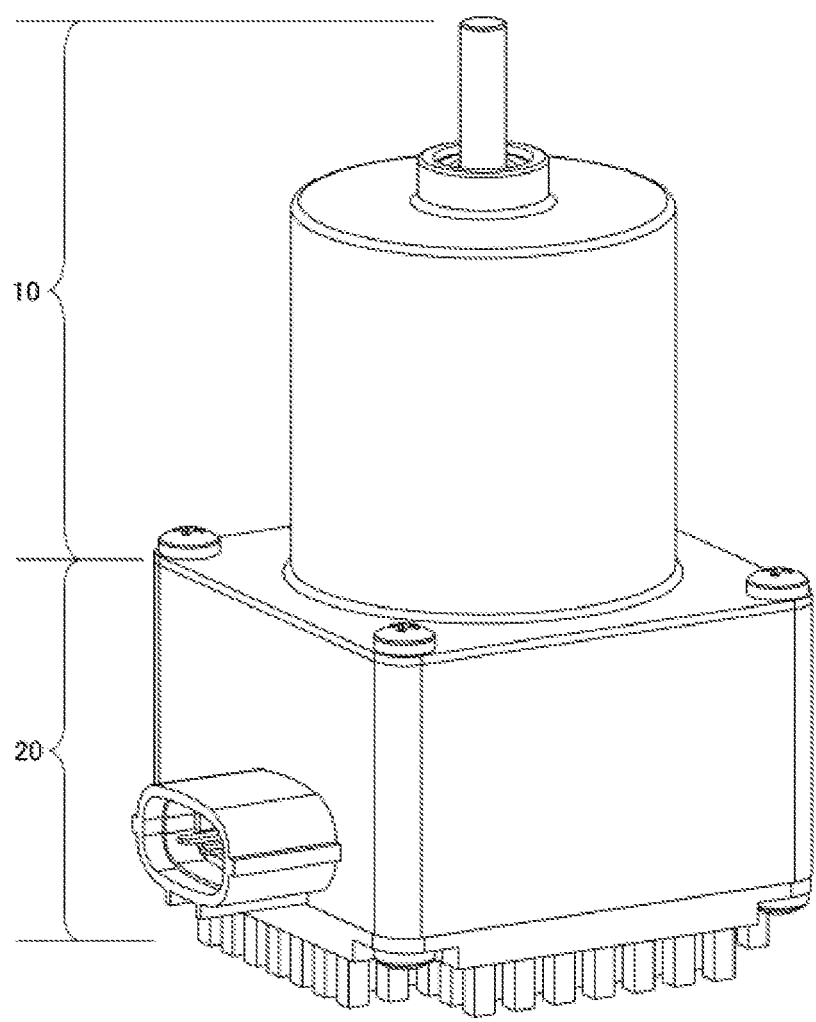
FIG. 1 is a perspective view of a motor in an embodiment according to the present disclosure.

Hereinafter, a mode for practicing the present disclosure (hereinafter referred to as an embodiment) will be described in detail with reference to the accompanying drawings.

Note that the same element will be denoted by the same reference character throughout the entire description of the embodiment.

Figure 2:
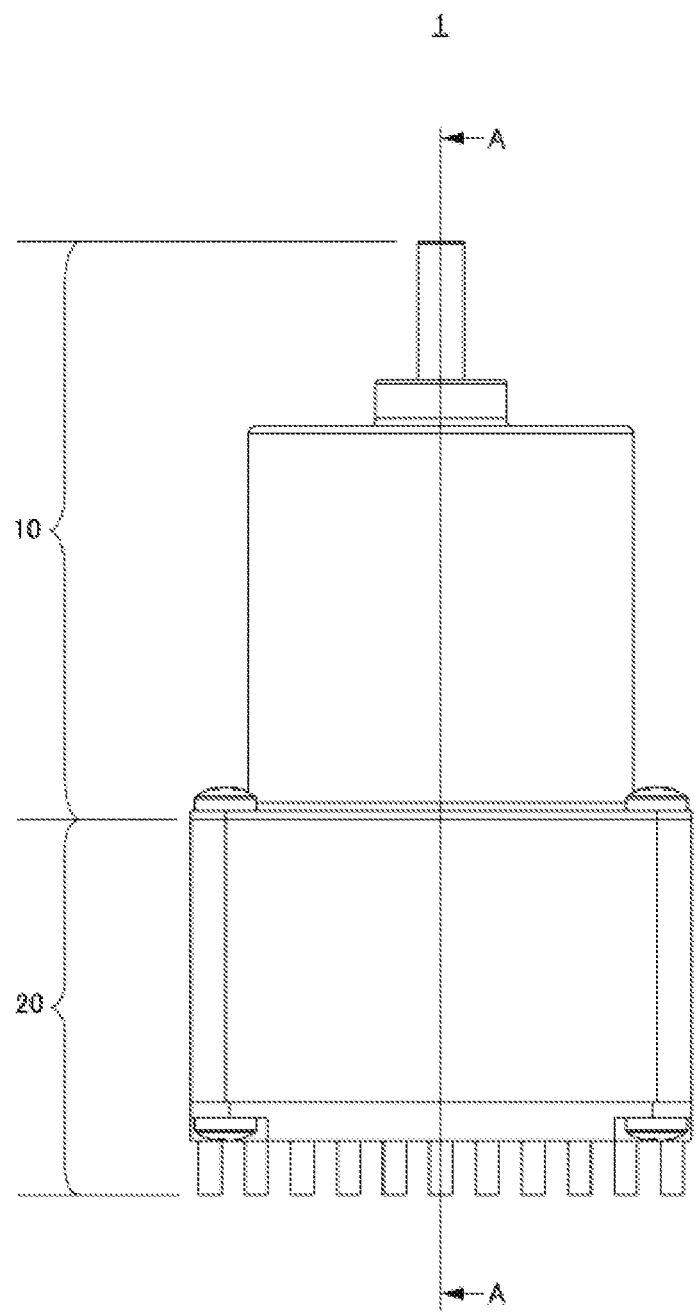
FIG. 2 is a plan view of the motor in the embodiment according to the present disclosure as viewed laterally.

FIG. 1 is a perspective view of a motor 1 according to an embodiment of the present disclosure, and FIG. 2 is a plan view of the motor 1 as viewed laterally.

As illustrated in FIG. 1 and FIG. 2, the motor 1 includes a motor body part 10 and a driving circuit part 20.

(Motor Body Part)

Figure 3:
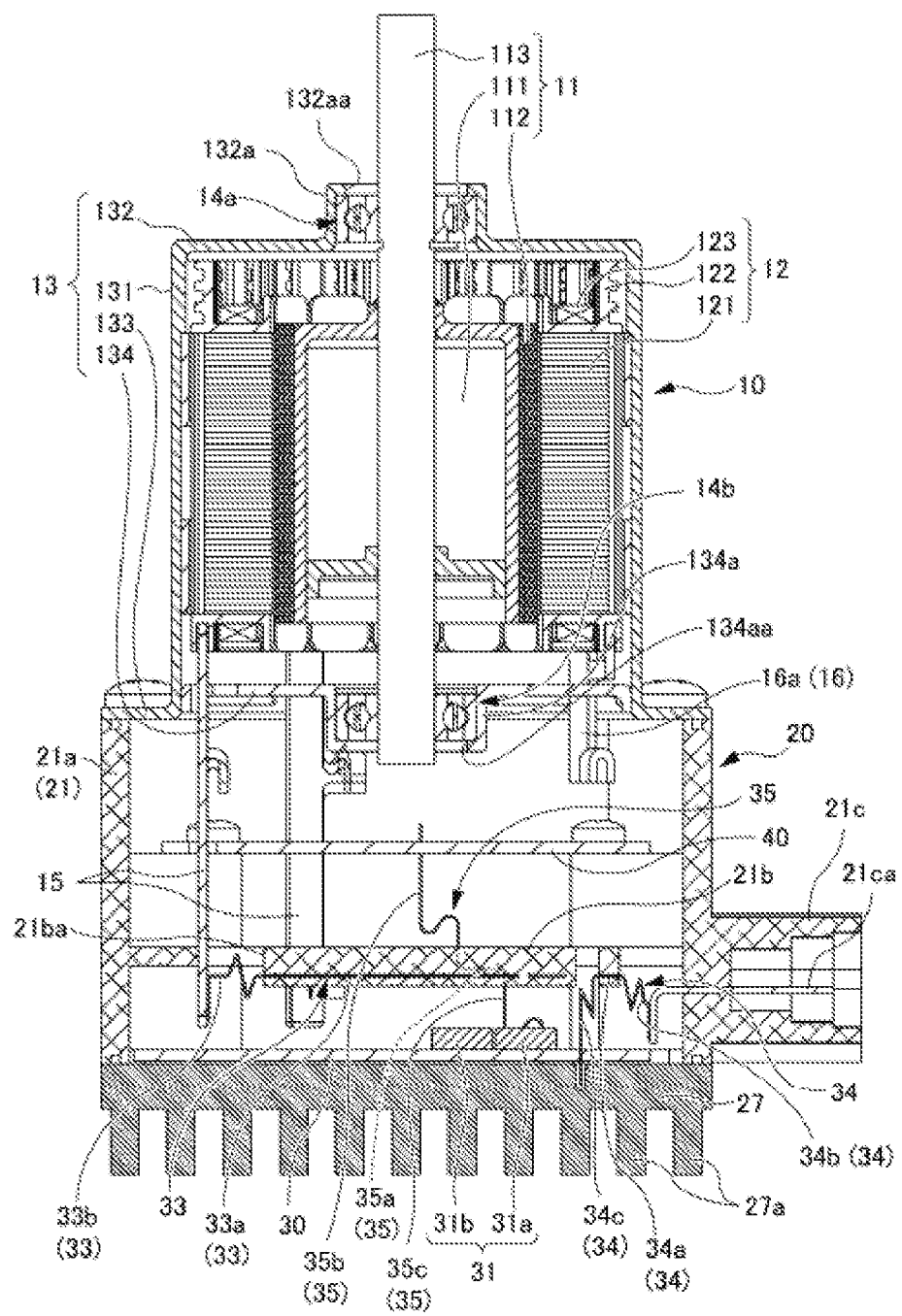
FIG. 3 is a cross-sectional view taken along the line A-A of FIG. 2.

FIG. 3 is a cross-sectional view taken along the line A-A of FIG. 2.

As illustrated in FIG. 3, the motor body part 10 includes a rotor 11 disposed in the center of the motor body part 10, a stator 12 disposed on the outer periphery of the rotor 11, and a frame 13 disposed in such a manner as to cover the outer periphery of the stator 12.

(Rotor)

The rotor 11 includes a rotor yoke 111, a rotor magnet 112 provided on the outer periphery of the rotor yoke 111, and a shaft 113 provided in such a manner as to be integrated with the rotor yoke 111 and penetrating through the center of the rotor yoke 111.

(Stator)

The stator 12 has an annular shape allowing the rotor magnet 112 to be rotatably housed in the center of the stator 12, and includes a stator core 121, an insulator 122 covering the stator core 121, and coils 123 wound on the insulator 122.

The stator 12 is fixed to a side wall portion 131 of a frame 13 described later by press-fitting or bonding. Hence, the stator 12 is integrated with the frame 13.

(Frame)

The frame 13 includes the side wall portion 131 being cylindrical and covering the outer periphery of the stator 12, a bottom portion 132 formed integrally with an end of the side wall portion 131 on one side (upper side), and a flange portion 133 formed integrally with the side wall portion 131 in such a manner as to extend outward from an end of the side wall portion 131 on other side (lower side).

The bottom portion 132 includes a recessed portion 132a formed in the center of the bottom portion 132 and protruding on the one side (upper side).

The recessed portion 132a includes a through hole 132aa formed in the center of the recessed portion 132a and being used for leading one side of the shaft 113 outward.

In the recessed portion 132a, a bearing part 14a supporting the shaft 113 in a freely rotatable manner is disposed.

Being supported by this bearing part 14a, the one side (upper side) of the shaft 113 is led outward through the through hole 132aa formed in the recessed portion 132a.

In addition, the frame 13 includes a lid portion 134 attached to an end of the side wall portion 131 on the other side (lower side).

The lid portion 134 includes, as with the bottom portion 132, a recessed portion 134a formed in the center of the lid portion 134 and protruding on the other side (lower side).

The recessed portion 134a also includes a through hole 134aa formed in the center of the recessed portion 134a and being used for allowing the other side of the shaft 113 to insert through the through hole 134aa.

Also in the recessed portion 134a, a bearing part 14b supporting the shaft 113 in a freely rotatable manner is disposed. Being supported by this bearing part 14b, an end of the other side (lower side) of the shaft 113 is led out toward the driving circuit part 20 through the through hole 134aa formed in the recessed portion 132a.

Accordingly, in the rotor 11, the shaft 113 is supported in a freely rotatable manner by the bearing part 14a and the bearing part 14b on one side (upper side) and the other side (lower side) so that the rotor magnet 112 is rotatably positioned in the center of the stator 12.

Therefore, the rotor 11 is provided so as to be rotatable relatively to the stator 12.

On the other side of the shaft 113, it suffices for the shaft 113 to be inserted through the bearing part 14b so that the shaft 113 is reliably supported by the bearing part 14b, and the end of the shaft 113 on the other side is not necessarily led out toward the driving circuit part 20.

Figure 4:
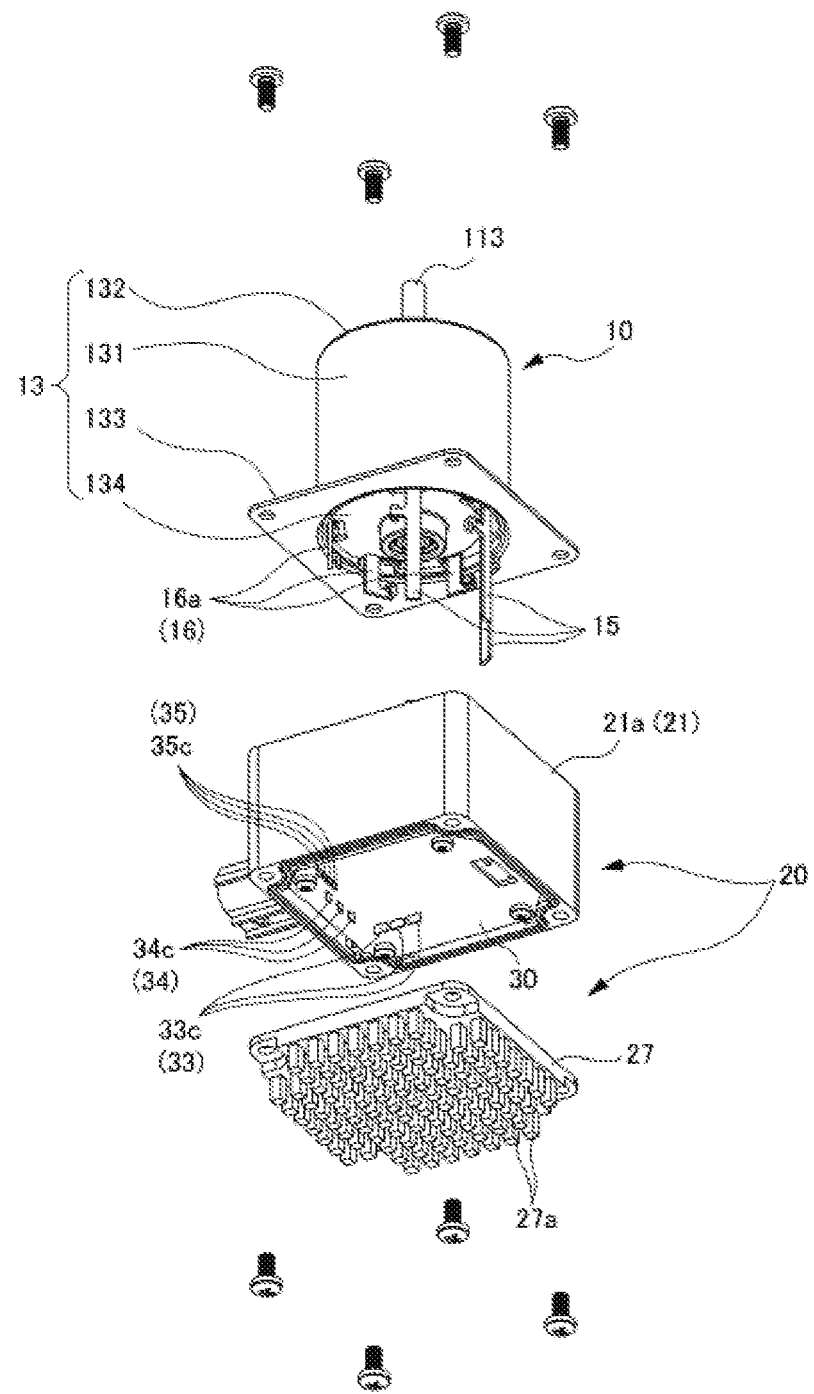
FIG. 4 is a partially exploded perspective view of the motor in the embodiment according to the present disclosure.

FIG. 4 is a partially exploded perspective view of the motor 1.

As illustrated in FIG. 3 and FIG. 4, the motor body part 10 is attached to the stator 12 and includes winding terminals 15 extending toward the driving circuit part 20, and a short-circuited terminal 16.

The short-circuited terminal 16 includes three connecting portions 16a configured to be connected to the coil 123. Although FIG. 4 illustrates the three connecting portions 16a from the motor body part 10 extending toward the driving circuit part 20, these three connecting portions 16a are connected together and short-circuited inside the motor body part 10.

Meanwhile, the motor 1 includes three winding terminals 15, and the three winding terminals 15 are electrically connected to end of conducting wires of the coils 123 forming different phases from one another, respectively.

As will be described later, these three winding terminals 15 are electrically connected to the driving circuit part 20 and supplied with current controlled by power devices 31 (e.g., power MOSFETs; Power Metal-Oxide-Semiconductor Field-Effect Transistors) of the driving circuit part 20.

The motor 1 according to the present embodiment includes the three winding terminals 15 because the motor 1 is a brushless motor, and the number of phases of the motor 1 is three. However, the number of phases itself is not to be limited. Therefore, the number of the winding terminals 15 may be increased or decreased so as to be commensurate with the number of phases required of the motor 1.

In addition, the type of the motor 1 is not to be limited to a brushless motor. Although description is made in the present embodiment about a case where the motor 1 is of an inner-rotor type including the rotor 11 positioned in the center of the motor 1, the motor 1 may be a motor of an outer-rotor type including a stator positioned in the center of the motor and a rotor disposed outside the stator.

When this current under control is supplied to the coils 123 forming the respective phases via the winding terminals 15, the coils 123 are energized so that the stator core 121 of the stator 12 rotates the rotor 11, and the motor 1 is driven.
(Driving Circuit Part)

The driving circuit part 20 includes, as illustrated in FIG. 3, a case 21 including a frame portion 21a, a first wiring board 30 housed in the case 21, a second wiring board 40 housed in the case 21, and a heat sink member 27 sealing an opening of the frame portion 21a on a side opposite to the motor body part 10.

Note that the heat sink member 27 described in the present embodiment is one including a plurality of radiator fins 27a, but the heat sink member 27 may be a heat sink member 27 being planar with no radiator fins 27a.
(First Wiring Board)

The first wiring board 30 is a board including a driving circuit formed on the board and the power devices 31 mounted on the board and is electrically connected with the winding terminals 15 of the motor body part 10 described above.

The electric connection between the first wiring board 30 and the winding terminals 15 will be described later.

Figure 5:
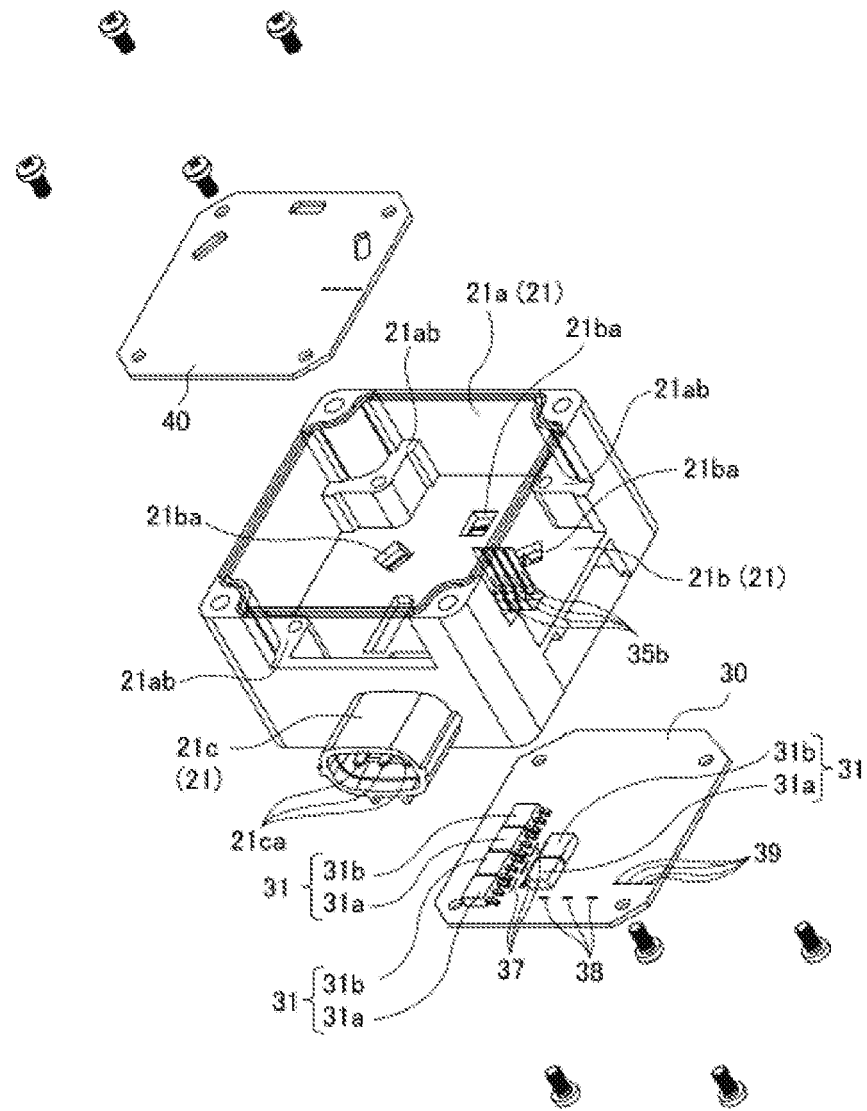
FIG. 5 is an exploded perspective view of a driving circuit part in the embodiment according to the present disclosure as viewed from a motor body part side.

FIG. 5 is an exploded perspective view of the driving circuit part 20 as viewed from a motor body part 10 side.

In FIG. 5, the heat sink member 27 is not illustrated, and the illustration of the frame portion 21a is partially omitted so as to make the inside of the case 21 visible.

As illustrated in FIG. 5, on the first wiring board 30, six power devices 31 are mounted corresponding to the three winding terminals 15 of the motor body part 10.

Specifically, for one winding terminal 15, a high-side power device 31a and a low-side power device 31b are provided in a pair.

Using the high-side power device 31a and the low-side power device 31b in such a manner enables control of positive and negative currents, enabling an increase in a use efficiency of electric power.

However, although the use efficiency of electric power is decreased, it is possible to configure a driving circuit to drive a motor 1 using only the high-side power device 31a. Thus, the configuration is not limited to providing two power devices 31 (the high-side power device 31a and the low-side power device 31b) as a set for one winding terminal 15.

The first wiring board 30 is also electrically connected with external connection terminals 21ca of a connector 21c provided in the case 21. The connection will be specifically described later.
(Second Wiring Board)

The second wiring board 40 is a board on which a controlling circuit for controlling the motor 1 is formed. The second wiring board 40 is electrically connected to the first wiring board 30. The connection will be specifically described later.

Note that the controlling circuit formed on the second wiring board 40 can be formed on the first wiring board 30. Accordingly, the controlling circuit may be formed on the first wiring board 30, and the second wiring board 40 may be omitted.
(Case)

Figure 6:
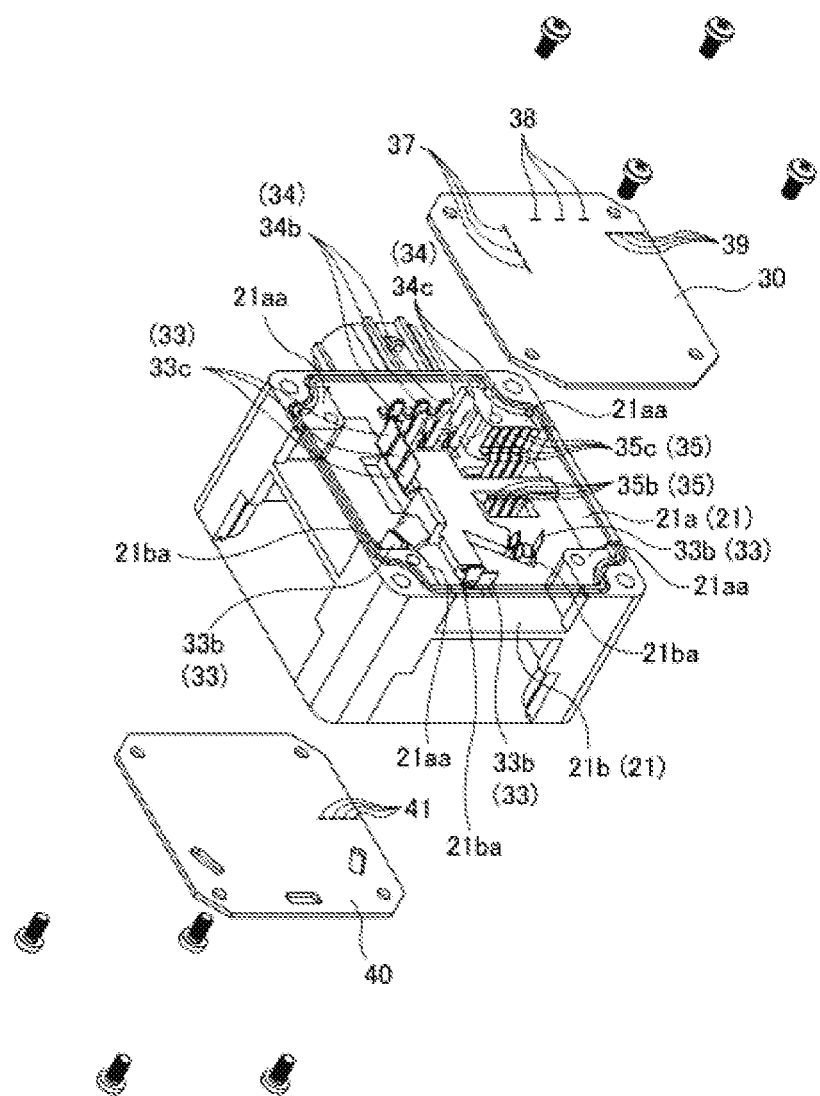
FIG. 6 is an exploded perspective view of the driving circuit part in the embodiment according to the present disclosure as viewed from a heat sink member side.

FIG. 6 is an exploded perspective view of the driving circuit part 20 as viewed from a heat sink member 27 side.

In FIG. 6, the heat sink member 27 is not illustrated, and the illustration of the frame portion 21a is partially omitted so as to make the inside of the case 21 visible.

As illustrated in FIG. 5 and FIG. 6, a case 21 includes a frame portion 21a including openings on both end sides of the frame portion 21a, a partitioning portion 21b partitioning the inside of the frame portion 21a into a space on one side being the motor body part 10 side and a space on the other side being the heat sink member 27 side, and a connector 21c provided on a space on the other side of the frame portion 21a on the heat sink member 27 side.

The frame portion 21a has an external shape being substantially rectangular, and as illustrated in FIG. 6, first attaching portions 21aa are provided at four corners of the inside of the frame portion 21a and each of the first attaching portions 21aa is formed with a screw fixing hole for fixing the first wiring board 30.

In addition, as illustrated in FIG. 5, second attaching portions 21ab are provided at four corners of the inside of the frame portion 21a on the motor body part 10 side of the first attaching portions 21aa (on the motor body part 10 side of the partitioning portion 21b). Each of the second attaching portions 21ab is provided with a screw fixing hole for fixing the second wiring board 40, and the partitioning portion 21b is provided at a position substantially in the middle between the first attaching portions 21aa and the second attaching portions 21ab.

When the motor 1 is driven, the motor body part 10 generates heat. However, the partitioning portion 21b is positioned closer to the motor body part 10 side than the first wiring board 30 and thermally insulates radiant heat from the motor body part 10 or heat due to convection or the like of gas at high temperature. Thus, temperature rises of the first wiring board 30 are inhibited, and it is possible to enhance reliability of a power circuit.

In addition, in the present embodiment, use is made of the case 21 made by integrally molding the frame portion 21a, the partitioning portion 21b, the connector 21c, the first attaching portions 21aa and the second attaching portions 21ab using a resin. Thus, the thermal conductivity of the case 21 is significantly lower than the thermal conductivity of a case formed of a metal or the like.

Here, as illustrated in FIG. 3, the frame portion 21a of the case 21 is directly fixed to the flange portion 133 of the frame 13 of the motor body part 10 with screws at an end on the one side, which is the motor body part 10 side. Thus, if the thermal conductivity of the frame portion 21a is high, heat of the motor body part 10 propagates through the frame portion 21a to the first wiring board 30, and the reliability of the power circuit decreases.

However, as in the present embodiment, when the frame portion 21a is formed of a resin having a low thermal conductivity, such propagation of heat can be inhibited, increases in temperature of the first wiring board 30 are inhibited, and it is possible to enhance the reliability of the power circuit further.

Moreover, as compared with the case of forming the case 21 using a metal, forming the case 21 using a resin allows weight reduction, as well as cost reduction by increasing volume productivity.

In addition, molding the case 21 using a resin allows the case 21 to have a shape too complex to form using a metal, and flexibility of the shape of the case 21 can be increased.

Meanwhile, as illustrated in FIG. 3, the first wiring board 30 is disposed so as to be positioned in the vicinity of the opening of the frame portion 21a on the other side being the heat sink member 27 side, and the heat sink member 27 is provided so as to seal the opening on the other side.

By disposing the first wiring board 30 in the vicinity of the heat sink member 27 so as to allow heat of the first wiring board 30 to be dissipated to the heat sink member 27 in such a manner, it is possible to keep the first wiring board 30 at a further lower temperature, enhancing the reliability of the power circuit.

Now, the case 21 formed of a resin material has a coefficient of linear expansion different from coefficients of linear expansion of terminals and the like formed of a metallic material (e.g., the winding terminals 15 of the motor body part 10, the external connection terminals 21ca of the connector 21c, etc.).

That is, expansion under influence of heat differs between the case 21 and the terminals.

For this reason, if the winding terminals 15 of the motor body part 10 are directly fixed to the first wiring board 30 which is in turn fixed to the case 21 using solder or the like so as to make electrical connection between the winding terminals 15 and the first wiring board 30, stresses are applied to the solder or the like when the winding terminals 15 expands due to heat of the motor body part 10, resulting in the risk of instable electrical connection such as occurrence of a crack in the solder or the like.

Thus, in the present embodiment, as illustrated in FIG. 3, FIG. 5, and FIG. 6, electrical connection between each of the three winding terminals 15 of the motor body part 10 and the first wiring board 30 is made using first electric wiring members 33 each formed of a plate material, and a first stress absorbing portion is provided in each of the first electric wiring members 33, the first stress absorbing portion having a shape configured to absorb the stresses.

In the present embodiment, three first electric wiring members 33 are used for the three winding terminals 15.

More specifically, as illustrated in FIG. 5 and FIG. 6, the partitioning portion 21b of the case 21 includes through hole portions 21ba formed at positions corresponding to the winding terminals 15. The through hole portions 21ba are provided to position the winding terminals 15 extending from the motor body part 10, on a first wiring board 30 side.

The first electric wiring members 33 each include, as illustrated in FIG. 3, a first relaying portion 33a embedded in the partitioning portion 21b and supported by the partitioning portion 21b, a first terminal side extending portion 33b led out from the first relaying portion 33a toward corresponding one of the winding terminals 15 through the through hole portion 21ba, and extending from the first relaying portion 33a toward the corresponding one of the winding terminals 15 and connected to the corresponding one of the winding terminals 15, and a first board side extending portion 33c led out from the partitioning portion 21b, and extending from the first relaying portion 33a toward the first wiring board 30 and connected to the first wiring board 30 (see FIG. 6).

This first terminal side extending portion 33b includes, as illustrated in FIG. 3, a first stress absorbing portion folded in a zigzag manner to be formed into a shape expandable against stresses, and a portion of the first terminal side extending portion 33b closer to a tip end side of the first terminal side extending portion 33b than the first stress absorbing portion is connected to one of the winding terminals 15 by welding.

Accordingly, even when the winding terminal 15 expands or contracts according to temperature conditions, the first stress absorbing portion formed in the first terminal side extending portion 33b expands or contracts in response to the expansion or contraction to absorb stress so that the stress is not applied to the welded portion between the first terminal side extending portion 33b and the winding terminals 15.

Consequently, breakage of the welded portion between the first terminal side extending portion 33b and the winding terminals 15 is avoided, and the electrical connection does not become instable.

The first board side extending portion 33c also includes, as illustrated in FIG. 6, a first stress absorbing portion folded in a zigzag manner to be formed into a shape expandable against stresses. A portion of the first terminal side extending portion 33b closer to a tip end side of the first terminal side extending portion 33b than the first stress absorbing portion is led out toward the heat sink member 27 of the first wiring board 30 through corresponding one of slit holes 37 of the first wiring board 30 (see FIG. 5 and FIG. 6) as illustrated in FIG. 4, and the portion of the first terminal side extending portion 33b having been led out is electrically connected to the first wiring board 30 using solder or the like.

Accordingly, breakage of the solder or the like due to expansion and contraction of the first terminal side extending portion 33b is also avoided between the first electric wiring member 33 and the first wiring board 30, and the electrical connection does not become instable.

Consequently, the electrical connection between the winding terminals 15 and the first wiring board 30 is always kept in a stable state.

In addition, the electrical connection via the first electric wiring members 33 enables the power devices 31 to be disposed in such a manner as to be gathered in one location, as illustrated in FIG. 5.

Accordingly, it is easy to make a design considering electromagnetic compatibility (EMC), such as disposing the power devices 31 in such a manner as to gather the power devices 31 together at a position allowing an electromagnetic shield for surrounding these power devices 31 to be provided easily and then providing the electromagnetic shield.

Furthermore, the first stress absorbing portion also plays a role of absorbing vibrations or the like, and thus anti-vibration performance is also enhanced.

Meanwhile, similar electrical connection is also made in the electrical connection between the external connection terminals 21ca of the connector 21c provided in the case 21 and the first wiring board 30. The connection will be described below.

As illustrated in FIG. 3, FIG. 5, and FIG. 6, electrical connection between the first wiring board 30 and the three external connection terminals 21ca of the connector 21c is made using second electric wiring members 34, each formed of a plate material.

In the present embodiment, three second electric wiring members 34 are used for the three external connection terminals 21ca.

The second electric wiring members 34 each include, as with the first electric wiring members 33, a second relaying portion 34a embedded in the partitioning portion 21b and supported by the partitioning portion 21b, a second terminal side extending portion 34b led out from the partitioning portion 21b, and extending from the second relaying portion 34a toward corresponding one of the external connection terminals 21ca and connected to the corresponding one of the external connection terminals 21ca, and a second board side extending portion 34c led out from the partitioning portion 21b, and extending from the second relaying portion 34a toward the first wiring board 30 and connected to the first wiring board 30.

The second terminal side extending portions 34b and the second board side extending portions 34c each include a second stress absorbing portion folded in a zigzag manner to be formed into a shape expandable against stresses.

A portion of the second terminal side extending portion 34b closer to a tip end side of the second terminal side extending portion 34b than this second stress absorbing portion is welded to one of the external connection terminals 21ca of the connector 21c to make the electrical connection, and a portion of the second board side extending portion 34c closer to the tip end side of the second board side extending portion 34c than the second stress absorbing portion is led out toward the heat sink member 27 of the first wiring board 30 through corresponding one of slit holes 38 formed in the first wiring board 30 (see FIG. 5 and FIG. 6) as illustrated in FIG. 4, and the portion of the second board side extending portion 34c having been led out is electrically connected to the first wiring board 30 using solder or the like.

Consequently, the electrical connection between the first wiring board 30 and the external connection terminals 21ca of the connector 21c is also kept in a stable state even under the influence of heat, vibration, or the like, as with the electrical connection between the winding terminals 15 and the first wiring board 30.

Furthermore, as illustrated in FIG. 3 and FIG. 6, also between the first wiring board 30 and the second wiring board 40, the electrical connection is made using third electric wiring members 35 (four in the present embodiment) formed of a plate material having a similar configuration.

Specifically, the third electric wiring members 35 each include a third relaying portion 35a embedded in the partitioning portion 21b and supported by the partitioning portion 21b, one third board side extending portion 35b led out from the partitioning portion 21b, and extending from the third relaying portion 35a toward the second wiring board 40 and connected to the second wiring board 40, and other third board side extending portion 35c led out from the partitioning portion 21b, and extending from the third relaying portion 35a toward the first wiring board 30 and connected to the first wiring board 30.

The one third board side extending portion 35b and the other third board side extending portion 35c each include a third stress absorbing portion folded in a zigzag manner to be formed into a shape expandable against stresses.

A portion of the one third board side extending portion 35b closer to a tip end side of the one third board side extending portion 35b than this third stress absorbing portion is led out toward the motor body part 10 of the second wiring board 40 through corresponding one of slit holes 41 of the second wiring board 40 (see FIG. 6), as illustrated in FIG. 3, and the portion of the one third board side extending portion 35b having been led out is electrically connected to the second wiring board 40 using solder or the like.

In addition, a portion of the other third board side extending portion 35c closer to a tip end side of the other third board side extending portion 35c than this third stress absorbing portion is led out toward the heat sink member 27 of the first wiring board 30 through corresponding one of slit holes 39 of the first wiring board 30 (see FIG. 6), as illustrated in FIG. 3, and the portion of the other third board side extending portion 35c having been led out is electrically connected to the first wiring board 30 using solder or the like.

Consequently, the electrical connection between the first wiring board 30 and the second wiring board 40 is also kept in a stable state even under the influence of heat, vibration, or the like, as with the electrical connection between the winding terminals 15 and the first wiring board 30, and with the electrical connection between the first wiring board 30 and the external connection terminals 21ca of the connector 21c.

As described above, by making the electrical connection between the winding terminals 15 of the motor body part 10 and the first wiring board 30 by the first electric wiring members 33, making the electrical connection between the external connection terminals 21ca of the connector 21c and the first wiring board 30 by the second electric wiring members 34, and making the electrical connection between the first wiring board 30 and the second wiring board 40 by the third electric wiring members 35, it is possible to implement, in addition to the effects described above, electrical connections between any positions using the first electric wiring members 33, the second electric wiring members 34 and the third electric wiring members 35, so the freedom in design can be significantly increased.

In addition, as in the present embodiment, if it is configured so that the first electric wiring members 33, the second electric wiring members 34, and the third electric wiring members 35 are embedded in the partitioning portion 21b of the case 21, it is possible to remarkably enhance workability in assembling the motor 1.

Furthermore, by forming structures for absorbing stresses in the first electric wiring members 33, the second electric wiring members 34 and the third electric wiring members 35, rather than providing the structures for absorbing stresses in portions for making electrical connection, it is possible to absorb the stresses in a reduced number of components.

(Modification)

Figure 7:
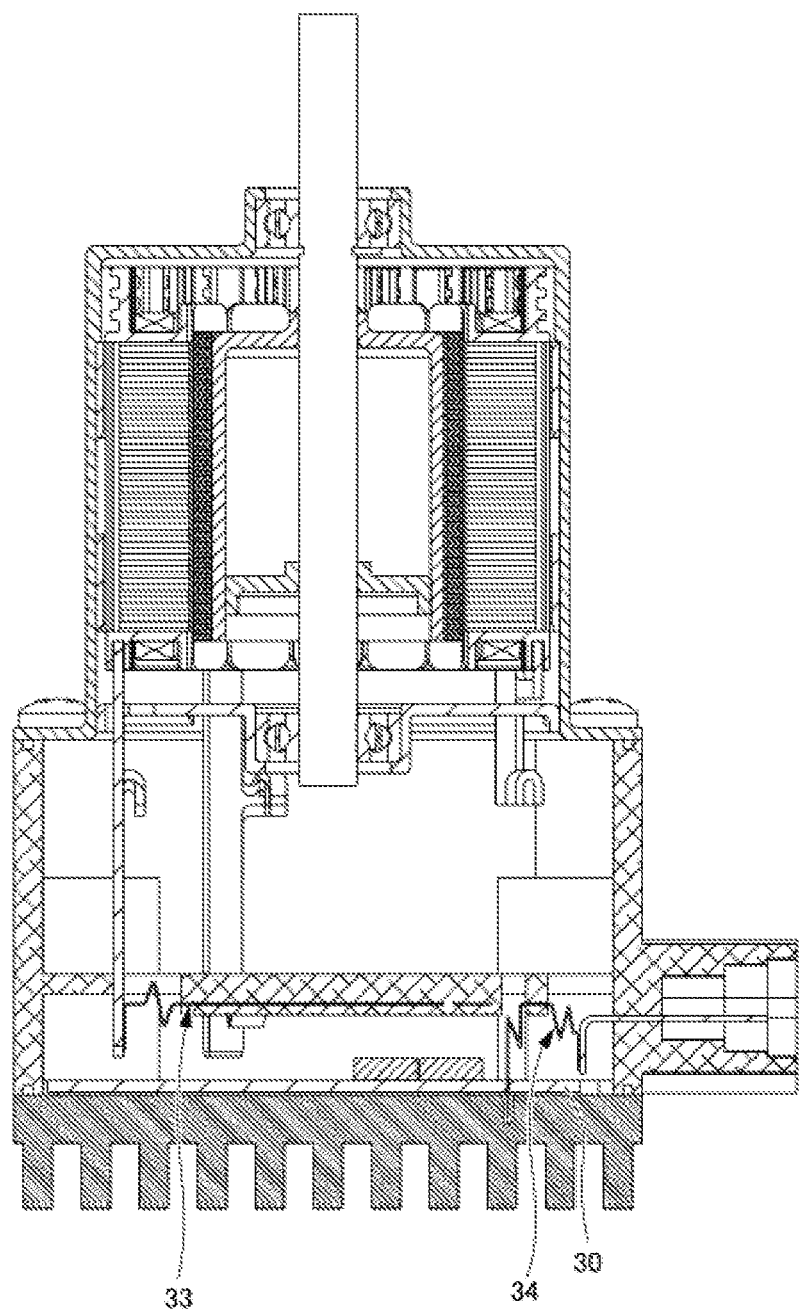
FIG. 7 is a diagram for illustrating a modification of the motor in the embodiment according to the present disclosure.

As briefly mentioned above, the second wiring board 40 is not an indispensable requirement, and the present embodiment may be configured as a modification illustrated in FIG. 7.

Specifically, as illustrated in FIG. 7, the second wiring board 40 (see FIG. 3), and the third electric wiring members 35 for making the electrical connection between the first wiring board 30 and the second wiring board 40 (see FIG. 3) may be omitted in such a manner as to form the controlling circuit for controlling the motor 1 on the first wiring board 30.

Also in the present modification, the remaining configuration may only be made as in the embodiment described above, and the description of the remaining configuration will not be made.

The present disclosure has been described above based on the embodiment, and the present disclosure is not limited to the embodiment.

For example, in the embodiment described above, the first stress absorbing portion, the second stress absorbing portion, and the third stress absorbing portion are formed in such a manner as to be folded in a zigzag manner but may be formed into any shape capable of expanding and contracting so as to absorb stresses. Thus, the first stress absorbing portion, the second stress absorbing portion, and the third stress absorbing portion need not be limited to the shape folded in a zigzag manner.

In the embodiment described above, the stress absorbing portions are each formed by folding a plate material, and thus the stress absorbing portions have elasticity. However, the elasticity is not an indispensable requirement, and it suffices for the stress absorbing portions to expand and contract in response to stresses so as to absorb the stresses.

However, having some elasticity is preferable because the elasticity provides a high shape stability in expansion and contraction.

In addition, in the embodiment described above, the number of positions for providing the stress absorbing portions (the first stress absorbing portions, the second stress absorbing portions, and the third stress absorbing portions) is two for each of the first electric wiring member 33, the second electric wiring member 34, and the third electric wiring member 35, but the number may be one or may be rather three.

Furthermore, in the embodiment described above, a description is made regarding the case where the case 21, the first wiring board 30, and the second wiring board 40 are each quadrilateral-shaped, but the shapes of the case 21, the first wiring board 30, and the second wiring board 40 are not limited in particular, and other kinds of shapes such as a triangle and a pentagon may be employed as appropriate.

In addition, the second wiring board 40 is disposed so as to be positioned closer to the motor body part 10 side than the partitioning portion 21b of the case 21 but may be provided so as to be closer to the heat sink member 27 side than the partitioning portion 21b, that is, on the same side as the first wiring board 30.

As seen from the above, the present disclosure is not limited to the embodiment described above, and various modifications can be made within the scope not departing from the gist of the present disclosure. This is apparent for those skilled in the art from the description of the scope of the claims of the present disclosure.

What is claimed is:

1. A motor comprising a motor body part and a driving circuit part,
the motor body part including:
a rotor;
a stator including a wound coil;
a winding terminal electrically connected to the coil and extending toward the driving circuit part; and
a frame housing the rotor and the stator, wherein
the driving circuit part includes:
a case including a first attaching portion inside the case and a frame portion with openings on both end sides of the frame portion;
a first wiring board including a driving circuit and a power device mounted on the first wiring board, the first wiring board being fixed to the first attaching portion; and
a first electric wiring member including a first stress absorbing portion formed into a zigzag shape configured to expand against stress, the first electric wiring member being arranged between the winding terminal and the first wiring board, and electrically connecting the winding terminal and the first wiring board,
wherein a first end of the winding terminal is connected to the coil and a second end of the winding terminal is connected to the first electric wiring member.

2. The motor according to claim 1, wherein
the case includes a partitioning portion provided at a position inside the frame portion, the position being closer to the motor body part than the first wiring board,
the frame portion and the partitioning portion are each formed of a resin material,
the first electric wiring member includes:
a first relaying portion supported by the partitioning portion;
a first terminal side extending portion extending from the first relaying portion toward the winding terminal and connected to the winding terminal; and a first board side extending portion extending from the first relaying portion toward the first wiring board and connected to the first wiring board, and
the first stress absorbing portion is provided in at least one of the first terminal side extending portion and the first board side extending portion.
3. The motor according to claim 1, wherein
the driving circuit part includes:
an external connection terminal led outward from an inside of the case, and
a second electric wiring member including a second stress absorbing portion formed into a shape absorbing stress, the second electric wiring member electrically connecting the external connection terminal and the first wiring board.
4. The motor according to claim 3, wherein
the case includes a partitioning portion provided at a position inside the frame portion, the position being closer to the motor body part than the first wiring board,
the frame portion and the partitioning portion are each formed of a resin material,
the second electric wiring member includes:
a second relaying portion supported by the partitioning portion;
a second terminal side extending portion extending from the second relaying portion toward the external connection terminal and connected to the external connection terminal; and
a second board side extending portion extending from the second relaying portion toward the first wiring board and connected to the first wiring board, and
the second stress absorbing portion is provided in at least one of the second terminal side extending portion and the second board side extending portion.
5. The motor according to claim 4, further comprising:
a first relaying portion supported by the partitioning portion;
a first terminal side extending portion extending from the first relaying portion toward the winding terminal and connected to the winding terminal; and
a first board side extending portion extending from the first relaying portion toward the first wiring board and connected to the first wiring board, wherein
the first stress absorbing portion is provided in at least one of the first terminal side extending portion and the first board side extending portion.
6. The motor according to claim 3, wherein
the case includes a second attaching portion provided inside the case, the second attaching portion being provided closer to the motor body part than the first attaching portion, and
the driving circuit part includes:
a second wiring board fixed to the second attaching portion; and
a third electric wiring member including a third stress absorbing portion formed into a shape absorbing stress, the third electric wiring member electrically connecting the second wiring board and the first wiring board.
7. The motor according to claim 6, wherein
the first electric wiring member, the second electric wiring member, and the third electric wiring member are each formed of a plate material.
8. The motor according to claim 6, wherein
the first stress absorbing portion, the second stress absorbing portion, and the third stress absorbing portion are each formed into a shape expandable according to stress.

9. The motor according to claim 6, wherein
the case includes a partitioning portion provided at a position inside the frame portion, the position being between the first wiring board and the second wiring board, and
the frame portion and the partitioning portion are each formed of a resin material.
10. The motor according to claim 9, wherein
the first electric wiring member includes:
a first relaying portion supported by the partitioning portion;
a first terminal side extending portion extending from the first relaying portion toward the winding terminal and connected to the winding terminal; and
a first board side extending portion extending from the first relaying portion toward the first wiring board and connected to the first wiring board, and
the first stress absorbing portion is provided in at least one of the first terminal side extending portion and the first board side extending portion.
11. The motor according to claim 10, wherein
the first relaying portion is embedded in the partitioning portion.
12. The motor according to claim 9, wherein
the second electric wiring member includes:
a second relaying portion supported by the partitioning portion;
a second terminal side extending portion extending from the second relaying portion toward the external connection terminal and connected to the external connection terminal; and
a second board side extending portion extending from the second relaying portion toward the first wiring board and connected to the first wiring board, and
the second stress absorbing portion is provided in at least one of the second terminal side extending portion and the second board side extending portion.
13. The motor according to claim 12, wherein
the second relaying portion is embedded in the partitioning portion.
14. The motor according to claim 9, wherein
the third electric wiring member includes:
a third relaying portion supported by the partitioning portion;
one third board side extending portion extending from the third relaying portion toward the second wiring board and connected to the second wiring board; and
other third board side extending portion extending from the third relaying portion toward the first wiring board and connected to the first wiring board, and
the third stress absorbing portion is provided in at least one of the one third board side extending portion and the other third board side extending portion.
15. The motor according to claim 14, wherein
the third relaying portion is embedded in the partitioning portion.
16. A motor comprising a motor body part and a driving circuit part,
the motor body part including:
a rotor;
a stator including a wound coil;
a winding terminal electrically connected to the coil and extending toward the driving circuit part; and
a frame housing the rotor and the stator, wherein the driving circuit part includes:

a case including a first attaching portion inside the case and a frame portion with openings on both end sides of the frame portion;

a first wiring board including a driving circuit and a power device mounted on the first wiring board, the first wiring board being fixed to the first attaching portion, wherein the winding terminal is electrically connected to the power device mounted on the first wiring board; and a first electric wiring member including a first stress absorbing portion formed into a shape absorbing stress, wherein the first electric wiring member is formed of a plate material and the first stress absorbing portion is formed by folding the plate material, the first electric wiring member being arranged between the winding terminal and the first wiring board, and electrically connecting the winding terminal and the first wiring board.

17. A motor comprising a motor body part and a driving circuit part, the motor body part including:

a rotor;

a stator including a wound coil;

a winding terminal electrically connected to the coil and extending toward the driving circuit part; and a frame housing the rotor and the stator, wherein the driving circuit part includes:

a case including a first attaching portion inside the case and a frame portion with openings on both end sides of the frame portion;

a first wiring board including a driving circuit and a power device mounted on the first wiring board, the first wiring board being fixed to the first attaching portion, wherein the winding terminal is supplied with current controlled by the power device mounted on the first wiring board and wherein the winding terminal is electrically connected to the power device mounted on the first wiring board; and a first electric wiring member including a first stress absorbing portion formed into a zigzag shape configured to expand against absorbing stress, wherein the first electric wiring member is formed of a plate material and the first stress absorbing portion is formed by folding the plate material, the first electric wiring member being arranged between the winding terminal and the first wiring board, and electrically connecting the winding terminal and the first wiring board, wherein a first end of the winding terminal is connected to the coil and a second end of the winding terminal is connected to the first electric wiring member.

* * * * *